United States Patent
Takagi

[11] Patent Number: 5,870,533
[45] Date of Patent: Feb. 9, 1999

[54] DATA RECEIVING SYSTEM

[75] Inventor: Eiji Takagi, Nagano, Japan

[73] Assignee: Seiko Epson Corporation, Tokyo, Japan

[21] Appl. No.: 954,607

[22] Filed: Oct. 20, 1997

Related U.S. Application Data

[62] Division of Ser. No. 458,242, Jun. 2, 1995.

[30] Foreign Application Priority Data

Jun. 2, 1994 [JP] Japan .................................. 6-121478

[51] Int. Cl.$^6$ .................................................. G06F 15/00
[52] U.S. Cl. ........................................... 395/114; 395/112
[58] Field of Search ..................... 395/114, 112, 395/113, 115, 116, 117, 101, 500, 527, 828, 830, 831, 834, 835, 836, 837, 838, 839, 882, 884, 892, 851, 840, 841, 852, 883; 358/407, 434, 435, 436, 437, 438, 439, 468

[56] References Cited

U.S. PATENT DOCUMENTS

| | | | |
|---|---|---|---|
| 4,992,957 | 2/1991 | Aoyama et al. | 395/112 |
| 5,025,398 | 6/1991 | Nelson | 395/112 |
| 5,185,853 | 2/1993 | Cheng et al. | 395/114 |
| 5,239,627 | 8/1993 | Beck et al. | 395/892 |
| 5,255,986 | 10/1993 | Koiwai | 395/114 |
| 5,293,466 | 3/1994 | Bringmann | 395/112 |
| 5,371,837 | 12/1994 | Kimber et al. | 395/112 |
| 5,382,968 | 1/1995 | Endoh | 395/114 |
| 5,392,419 | 2/1995 | Walton | 395/114 |
| 5,425,135 | 6/1995 | Motoyama et al. | 395/114 |
| 5,507,003 | 4/1996 | Pipkins | 395/851 |
| 5,633,992 | 5/1997 | Gyllenskog | 395/114 |

FOREIGN PATENT DOCUMENTS

| | | |
|---|---|---|
| 0501489 | 9/1992 | European Pat. Off. . |
| 0558804 | 9/1993 | European Pat. Off. . |

OTHER PUBLICATIONS

"Centronics–Schnittstellen automaticsch umgeschaltet", Electronik, vol. 34, No. 1, Jan. 1, 1985, pp. 65–66.

Primary Examiner—Edward L. Coles
Assistant Examiner—Dov Popovici
Attorney, Agent, or Firm—Sughrue, Mion, Zinn, Macpeak & Seas, PLLC

[57] ABSTRACT

A system for causing a device such as a printer to receive data from an external device such as a host computer, the system allowing the printer to automatically set not only a pattern for outputting an acknowledge signal (ACK) and a busy signal (BUSY) but also the capacity of a receiving buffer so as to match the external device, so that efficient data reception can be made, thereby freeing the external device at an early stage of the data reception.

2 Claims, 3 Drawing Sheets

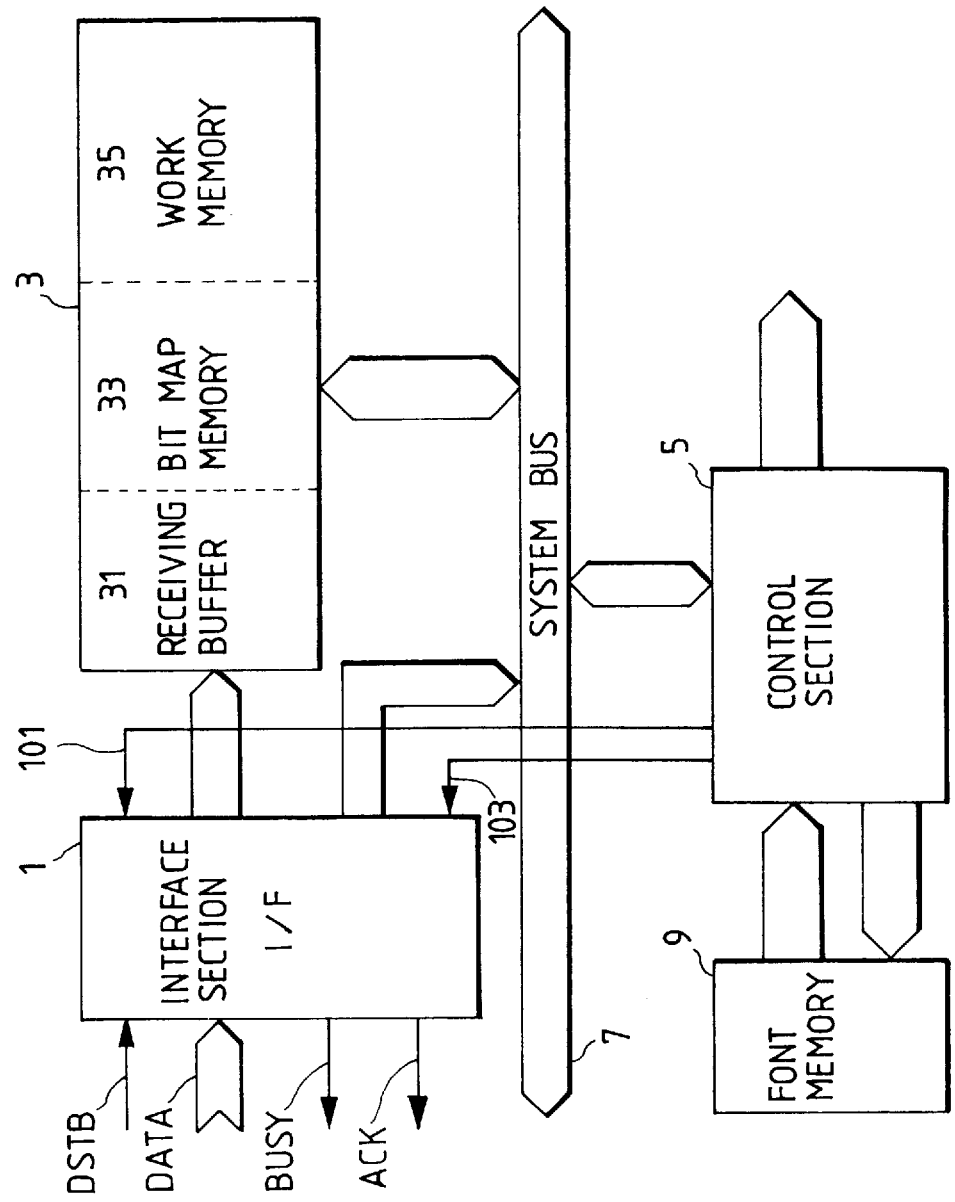

DATA RECEIVING SYSTEM

This is a divisional of application Ser. No. 08/458,242 filed Jun. 2, 1995.

BACKGROUND OF THE INVENTION

1. Field of the Invention

The invention relates to an improved data receiving system applied to the case where a device receives data from an external device, as, for example, a terminal printer which receives data from a host computer.

2. Description of Related Art

In the case where a terminal printer or the like receives data from a host computer, a handshake procedure such as shown in FIG. 1 is generally performed between both devices.

In FIG. 1, the host computer (hereinafter referred to as the "host") transmits data (hereinafter referred to as "DATA") to the printer, e.g., by the byte. In addition, during the transmission of each DATA, the printer is informed that effective data transmission is taking place by a data strobe signal (hereinafter referred to as "DSTB") which is caused to go low for a predetermined period of time.

The printer receives DATA in response to the fall of DSTB. After the reception of DATA, the printer causes a busy signal (hereinafter referred to as "BUSY") to go high to give the host an indication that the printer is not yet ready to receive next DATA. The host stands by instead of transmitting the next DATA while BUSY is high.

When ready to receive the next DATA, the printer not only gives the host an indication that the printer acknowledges reception of DATA by causing an acknowledge signal (hereinafter referred to as "ACK") to go low for a predetermined period of time, but also informs the host that the printer is now ready to receive DATA by causing BUSY to go low. In response thereto, the host begins transmitting the next DATA, and causes DSTB to go low for a predetermined period of time. The aforementioned operations are repeated until the last DATA is transmitted.

In the aforementioned handshake procedure, there are two systems for causing the host to recognize that the printer is ready to receive DATA. One system is, as described above, that in which the host refers to both ACK and BUSY sent from the printer. The other system is that in which the host refers only to BUSY. No matter which system the host opts, normal handshaking is established as long as the printer outputs both ACK and BUSY.

However, if the host refers only to BUSY, it is better to cause the printer to match the system opted by the host. That is, it is better to design the system so that the printer can receive DATA from the host as soon as possible by immediately causing BUSY to go low without outputting ACK as long as the printer is ready to receive DATA. This system eliminates waste of time, thereby contributing to freeing the host at an early stage of processing.

Thus, the system that has heretofore been used is that ACK or BUSY can be manually selected on the printer side so as to match the system of the host. However, such selection is not only cumbersome but also so highly technical for the user, that many users, in reality, operate the printer based on the system of outputting both ACK and BUSY which are defaults. As a result, with respect to the host that refers only to BUSY, the printer occupies the host for a longer time than necessary.

Further, the printer, while executing the aforementioned handshake procedure with respect to the host, stores received DATA in a receiving buffer contained therein and sequentially takes out DATA within the receiving buffer concurrently therewith. If the receiving buffer is kept full with the processing of DATA within the printer being behind the transmission of DATA from the host during this process, the printer maintains BUSY high until an empty space is available in the receiving buffer, which in turn keeps the host waiting until subsequent DATA can be transmitted.

To avoid this inconvenience, it is desired that the printer has a receiving buffer whose capacity is suited for printer speed, transmission speed by the host, and the total volume of DATA. To meet this requirement, conventional printers are designed to manually set the capacity of the receiving buffer.

However, the aforementioned problem is encountered if the capacity of the receiving buffer is too small, and memory areas within the printer for other processing become eroded if the capacity of the receiving buffer is too large. Therefore, to determine an appropriate capacity is too difficult a task for the user. Thus, many users accept the default capacity of the receiving buffer, which in turn keeps the host waiting for a longer time than necessary.

SUMMARY OF THE INVENTION

As described above, although the conventional printer is designed to manually select and set not only the ACK/BUSY system with respect to the host but also the capacity of the receiving buffer, such operation is cumbersome and highly technical for ordinary users. As a result, in reality many users operate their printer using defaults, which in turn occupies the host for a longer time than necessary and therefore prevents a user from obtaining optimal performance from the printer.

Therefore, an object of the invention is to provide a system for receiving data from an external device, which allows the system to automatically set an appropriate ACK/BUSY system with respect to the external device and an appropriate capacity of the receiving buffer, thereby contributing to freeing the external device at an early stage of the processing.

A first aspect of the invention is applied to a data receiving system for receiving data from an external device, comprising: an interface means for providing the external device with a communication interface, the interface means selectively using a signal pattern out of a predetermined plurality of signal patterns, each of the predetermined plurality of signal patterns consisting of either one or both of a busy signal and an acknowledge signal in informing the external device that data is ready to be received; a signal pattern selecting means for selecting a signal pattern suitable for the external device out of the plurality of signal patterns based on the data received from the external device; and a control means for controlling the interface means so that the interface means will use a predetermined standard signal pattern out of the plurality of signal patterns as an initial condition and that when another signal pattern is selected by the signal pattern selecting means, the interface means will use such selected signal pattern thereafter.

A second aspect of the invention is applied to a data receiving system for receiving data from an external device, comprising: an interface means for providing the external device with a communication interface; a receiving buffer for temporarily storing data received from the external device until the received data is subjected to processing; a transmitting capability judging means for judging a data transmitting capability of the external device by observing a response time of the external device with respect to the interface means; and a buffer capacity control means for variably setting a capacity of the receiving buffer in accordance with the judged transmitting capability.

The system according to the first aspect of the invention is characterized by automatically setting the ACK/BUSY pattern to a signal pattern suited for the external device judged based on the data from the external device, the ACK/BUSY pattern being sent from the interface means to the external device to give the external device an indication that the printer is ready to receive data from the external device. Therefore, efficient data reception can be effected with an appropriate signal pattern without involving cumbersome operation on the part of the user, thereby contributing to freeing the external device at an early stage of the processing.

As a means for selecting a signal pattern, e.g., the following technique can be employed. The technique involves the step of identifying the language used by the external device based on the received data, so that the signal pattern can be selected so as to match the identified language, because the determination of a usable signal pattern generally depends on the language. How the language used by the external device is identified is disclosed, e.g., in Unexamined Japanese Patent Publication No. Hei. 1-64029.

The system according to the second aspect of the invention is characterized as evaluating the data transmission capability of the external device from the response time of the external device with respect to the interface means and automatically setting the size of the receiving buffer in accordance therewith. Therefore, the appropriate receiving buffer capacity can be set automatically without involvement by the user, which in turn implements efficient data reception, thereby contributing to freeing the external device at an early stage of the processing.

A time $T_{BS}$, which is defined as a time between the fall of BUSY from the interface means and the rise of DSTB from the external device, may be used as the response time of the external device. Although one external device may be of such a type as to respond to BUSY from the interface means and another external device may be of such a type as to respond to ACK from the interface means, the printer can take care of either type of external device as long as $T_{BS}$ is employed.

BRIEF DESCRIPTION OF THE DRAWINGS

FIG. 2 is a block diagram showing the configuration of the main part of a printer having an embodiment of the invention applied thereto.

DETAILED DESCRIPTION OF THE PREFERRED EMBODIMENTS

FIG. 2 is a block diagram showing the configuration of a data receiving section of the terminal printer that is an embodiment to which a data receiving system of the invention is applied.

Figure 1:
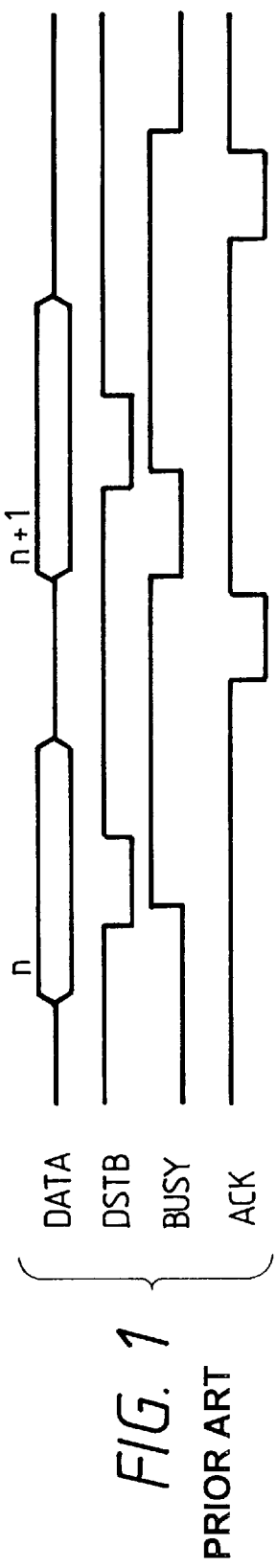
FIG. 1 is a timing chart showing a common handshake procedure between a host computer and a printer.

In FIG. 2, an interface section 1 provides a not shown externally connected host (host computer) with a communication interface. The interface section 1 receives such signals as DSTB (data strobe signal) and DATA (data) from the host and outputs such signals as BUSY (busy signal) and ACK (acknowledge signal) to the host. The interface section 1 has two BUSY/ACK patterns from which to select so as to give the host an indication that the printer is ready to receive data from the host. One pattern, characterized as using both ACK and BUSY and as outputting ACK while BUSY is high, as shown in FIG. 1, is termed the "ACK-in-BUSY" pattern. The other pattern, characterized as using only BUSY and therefore being expressed as a pattern with ACK removed from the time chart shown in FIG. 1, is therefore termed as the "BUSY-only" pattern.

A RAM 3 is used as a receiving buffer 31, a bit map memory 33, a work memory 35, and the like. The receiving buffer 31 takes in and temporarily holds the received DATA from the interface section 1. The bit map memory 33 develops a bit map image to be printed, the bit map image being obtained by processing the DATA at a control section 5 (to be described later). The work memory 35 is a work area for the control section 5.

The capacity of the receiving buffer 31 is, as will be described later, designed to be variable in accordance with the DATA transmission capability of the host and the DATA processing capability of the control section 5. The work memory 35 is also variable in accordance with the capacity of the receiving buffer 31.

The interface section 1 and the RAM 3 are connected to the control section 5 through a system bus 7. The control section 5 is a programmed microcomputer, and is connected to a font memory 9 and a not shown printing mechanism. The control section 5 performs the operations of controlling the interface section 1, setting the capacity of the receiving buffer 31, reading the DATA from the receiving buffer 31, processing the read DATA, writing and reading the bit map data obtained by such processing to and from the bit map memory 33, controlling the printing mechanism for outputting the read bit map data, and a like operation.

Among the aforementioned operations performed by the control section 5, it is the operations of controlling the interface section 1 and setting the capacity of the receiving buffer 31 that are relevant to the invention. With respect to the other operations, appropriate existing processing methods can be employed, and the description thereof will therefore be omitted.

The control section 5 is designed to give the interface section 1 two kinds of control signals 101, 103 to control the interface section 1. The control signal 101 selects a BUSY-ACK pattern from the "ACK-in-BUSY" and the "BUSY-only" pattern. The other control signal 103 gives an indication that the printer is ready to receive DATA (DATA RECEPTION READY) or that the printer is not yet ready to receive DATA (DATA RECEPTION NOT READY). Upon switchover of the control signal 103 from DATA RECEPTION NOT READY to DATA RECEPTION READY, the interface section 1 first outputs ACK and then causes BUSY to go low, as shown in FIG. 1, in the "ACK-in-BUSY" pattern; whereas the interface section 1 immediately causes BUSY to go low without sending ACK in the "BUSY-only" pattern. Further, when the control signal 103 is switched over from DATA RECEPTION READY to DATA RECEPTION NOT READY, the interface section 1 causes BUSY to go high from the low state in either pattern.

Figure 3:
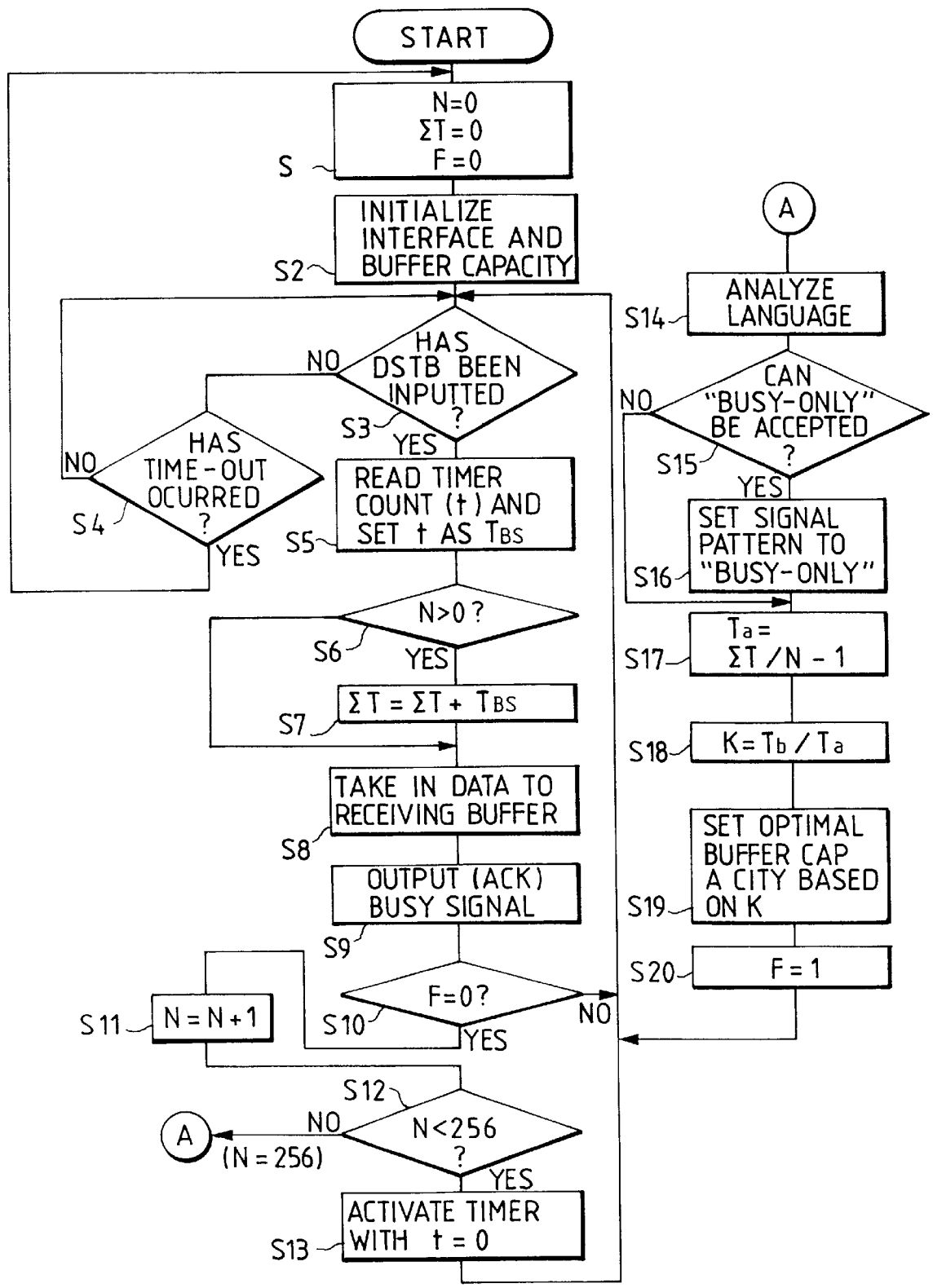
FIG. 3 is a flowchart showing the flow of a data reception processing in a preferred embodiment of the invention.

FIG. 3 shows a flow of the procedure of controlling the interface section 1 and setting the capacity of the receiving buffer 31 performed by the control section 5 in association with data reception from the host computer.

First, when the power supply of the printer has been turned on, the number of received bytes N, the transmission response time integrated value ΣT, and the capacity setting flag F are set to 0, respectively (Step S1). Then, the ACK/BUSY pattern of the interface section 1 is set to "ACK-in-BUSY", and the capacity of the receiving buffer is set to a predetermined standard value (e.g., 50 kB) as initial conditions (Step S2).

Figure 4B:
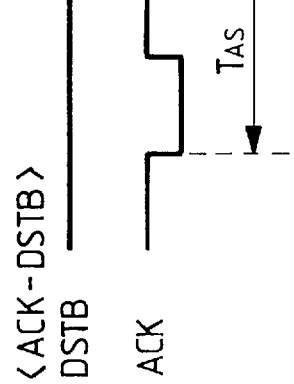
FIGS. 4A and 4B are timing charts illustrative of a transmission response time.
Figure 4A:
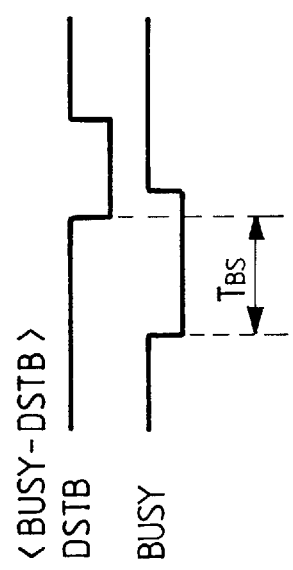

By the number of received bytes N is meant a value obtained by counting the number of bytes of DATA sent from the host on a byte basis. By the transmission response time integrated value ΣT is meant a value obtained by integrating times, each time being from when the host recognizes that the printer is ready to receive DATA to when the host outputs DSTB, i.e., a transmission response time of the host, the times being as many as the number of received bytes N. The transmission response time may be defined either as a time $T_{BS}$ from the fall of BUSY to the fall of DSTB as shown in FIG. 4A or as a time $T_{AS}$ from the fall of ACK to the fall of DSTB as shown in FIG. 4B. The time $T_{BS}$ in FIG. 4A is employed in this embodiment. The reason therefor is that even if the host is of such a type as to apply DSTB in response to the fall of ACK or of such a type as to apply DSTB in response to the fall of BUSY, the time from the fall of ACK to the fall of BUSY is so short and fixed that the time $T_{BS}$ can be used as a common reference.

Further, by the capacity setting flag F is meant a flag for indicating that the capacity of the receiving buffer 31 has been set, with F=0 meaning that the capacity has not been set and with F=1 meaning that the capacity has been set.

After the aforementioned initialization, the host is informed that the printer is ready to receive DATA by the "ACK-in-BUSY" pattern (i.e., ACK is caused to go low for a predetermined period of time, and then BUSY is caused to go low), and then whether or not DSTB has been inputted from the host is checked (Step S3). While DSTB is not inputted, the elapsed time t from the fall of BUSY is counted by a timer to check whether or not such input absent time t has reached a predetermined DATA end judgment time (Step S4). If the input absent time t has reached the DATA end judgment time, the control section 5 judges that DATA input from the host has ended and returns to Step S1.

On the other hand, if DSTB is inputted before the DATA end judgment time is up, then it is judged that DATA is continuously being inputted, so that the transmission response time $T_{BS}$ is stored as the timer value t at this input timing (Step S5). The control section 5 then proceeds to Step S6. In Step S6, whether or not the number of received bytes N is 0 is checked, and if N>0, the transmission response time $T_{BS}$ is added to the integrated value ΣT (Step S7), and DATA is taken into the receiving buffer (Step S8). On the other hand, if N=0 in Step S6, then DATA is taken into the receiving buffer in Step S8 immediately by bypassing Step S7, since this is the first DATA input operation.

After DATA has been taken into the receiving buffer, BUSY is caused to go high once. When the printer is ready to receive DATA, ACK is outputted and BUSY is caused to go low to inform the host that the printer is ready to receive DATA (Step S9).

Then, the capacity setting flag F is checked (Step S10). If F=0, i.e., if the capacity of the receiving buffer has not yet been set, the number of bytes N is incremented by 1 (Step S11), and whether or not N has reached a predetermined required number of bytes (256 bytes in this embodiment) is checked (Step S12). IF N has not reached the predetermined number, the timer value t is cleared to reactivate the timer (Step S13). The control section 5 then returns to Step S3.

The processing in steps S3 to S13 is repeated until the number of received bytes N is equal to 256. As a result of such processing, the integrated value of the transmission response times $T_{BS}$ of the respective byte reception times from the DATA receiving start to the 256th DATA receiving time is obtained as the response time integrated value ΣT.

Then, when the number of received bytes N has reached 256, the control section 5 proceeds to Step S14 through judgment in Step S12. In Step S14, the received 256-byte DATA is analyzed to determine in what language the data is written. For this language analysis, a method disclosed, e.g., in Unexamined Japanese Patent Publication No. Hei. 1-64029 may be used. Since the content of this language analysis method does not constitute the essence of the invention, a detailed description thereof will be omitted. In short, the language used in the DATA is identified by first picking up elements characterizing languages from the description of the DATA, then totalling points, each point being assigned to each characteristic element of a language, on a language basis, and finally comparing the score of one language with that of another.

When the language used in the received DATA has been identified as a result of this language analysis, it is determined whether or not the BUSY/ACK pattern used by the language is the "BUSY-only" pattern (Step S15). In general, the languages used by the host come in two groups: one group of languages using only the "BUSY-only" pattern, and the other group using both the "BUSY-only" pattern and the "ACK-in-BUSY" pattern. Thus, the languages using only the "BUSY-only" pattern are registered in a table or the like in advance, and if the language is judged to belong to this group of languages, then the "BUSY-only" pattern is selected, and if the language is judged to belong to the other group of languages, then the initialized "ACK-in-BUSY" pattern is directly used. As a result of this operation, the host using only the "BUSY-only" pattern can use the "BUSY-only" pattern to ensure perfect compatibility in an ACK/BUSY pattern.

If the answer to the question in Step S15 is affirmative, the control signal 101 is sent to the interface section 1 to switch the "ACK-in-BUSY" pattern to the "BUSY-only" pattern (Step S16), whereas if the answer is negative, then the currently selected "ACK-in-BUSY" pattern is maintained.

Then, by dividing the transmission response time integrated value ΣT by the number of received bytes (N−1), the average transmission response time $T_a$ is calculated (Step S17). By dividing a predetermined reference processing time $T_b$ inherent in the printer by the transmission response time $T_a$, a coefficient K is calculated (Step S18). Here, by the reference processing time $T_b$ it is intended to mean a value reflecting the printer's DATA processing capability. If the printer has high processing capability, $T_b$ is short, and if the printer has low processing capability, $T_b$ is long. Therefore, the coefficient K indicates the relative degree of the host's DATA transmitting capability based on the printer's DATA processing capability. If K is large, the host has relatively high transmitting capability, whereas if K is small, the host has relatively low transmitting capability.

Then, the capacity of the receiving buffer 31 is determined based on the coefficient K (Step S19). Specifically, a plurality of coefficients K are provided. A table defining correspondence between the receiving buffer capacity and the coefficient is programmed in the control section 5 in advance, and the receiving buffer capacity is determined by referring to this table. Since the specific values within the table differ from one printer to another, such values will be defined on a printer type basis through experiments. At any rate, a larger receiving buffer capacity is set for a larger coefficient K (i.e., a higher host's transmitting capability), and a lower receiving buffer capacity is set for a smaller coefficient K.

Once the receiving buffer capacity has been set in this way, the capacity setting flag F is set to 1 (Step S20). Then, the control section 5 returns to Step S3.

From then onward, the loop consisting of Steps S3 to S10 is repeated until the last DATA is received.

In this embodiment, the printer starts receiving DATA from the host with the initialized "ACK-in-BUSY" pattern and at a receiving buffer capacity of 50 kB as described above. Upon reception of as many as 256 bytes of DATA, it is judged from the language in which the DATA is written whether or not the host uses the "BUSY-only" pattern. If the result of the judgment is affirmative, then not only the "BUSY-only" pattern is selected, but also the receiving buffer capacity is changed to match the host's transmitting capability by measuring the host's transmitting capability. As a result of these operations, the BUSY/ACK pattern and the receiving buffer capacity which are appropriate for data communication can be set automatically, which in turn allows the user to effect efficient data reception without involving any special setting operation and to free the host at an early stage of the processing.

It should be noted that the invention may be embodied in various other modes than the aforementioned embodiment. While the pattern selecting and capacity setting operations are performed by judging both the host's language and transmission capability upon reception of 256 bytes of DATA in the aforementioned embodiment, these operations may, e.g., be performed at different timings, i.e., upon reception of a number of bytes appropriate for the analysis of language and a number of bytes appropriate for the evaluation of the transmission capability, since these numbers are not necessarily coincident with each other.

Further, if the host's language is already known and such host's language is specified from the operation panel of the printer, then reception of DATA may be started with a BUSY/ACK pattern optimal for the printer from the outset.

Still further, the invention may also be applied to other devices, such as plotters, in addition to printers.

According to the invention, the system can automatically set the condition of a device suitable for the condition of an external device when the device receives data from the external device. Therefore, efficient data reception can be effected without troubling the user, which in turn allows the external device to be freed at an early stage of the processing.

What is claimed:

1. A data receiving system for receiving data from an external device, comprising:

an interface means for providing the external device with a communication interface, the interface means selectively using one handshake procedure out of a predetermined plurality of handshake procedures, wherein said predetermined plurality of handshake procedures includes at least one handshake procedure which uses both a busy signal and an acknowledge signal for informing the external device that data is ready to be received and at least one handshake procedure which uses only a busy signal for informing the external device that data is ready to be received;

a handshake procedure selecting means for selecting, from among said predetermined plurality of handshake procedures, handshake procedure suitable for the external device based on the data received from the external device; and a control means for controlling the interface means so that the interface means will use a predetermined standard handshake procedure as an initial condition and that the interface means will use a handshake procedure selected by the handshake procedure selecting means, after such a selection has been made.

2. A data receiving system according to claim 1, wherein the handshake procedure selecting means judges a language used by the external device from the received data and selects a handshake procedure in accordance with the judged language.

* * * * *